Figure 1:
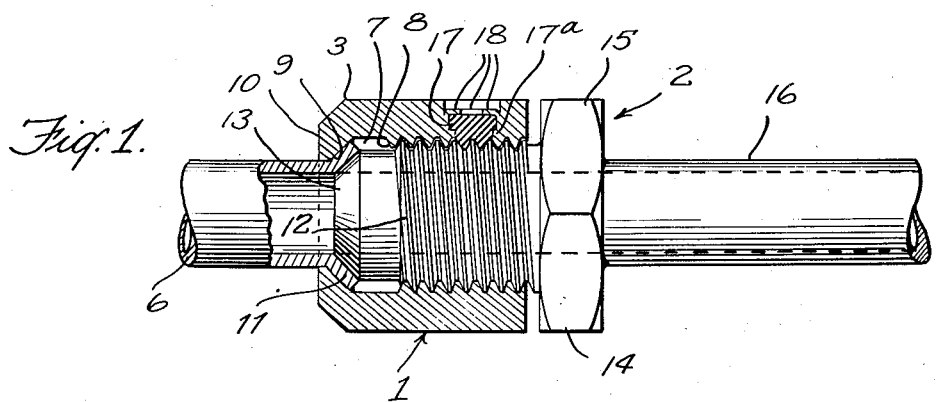

Feb. 28, 1950

R. LOVELL 2,499,104

COUPLING

Filed April 1, 1947

INVENTOR
ROBERT LOVELL
BY George F. Gill
ATTORNEY

Patented Feb. 28, 1950

2,499,104

UNITED STATES PATENT OFFICE 2,499,104

COUPLING

Robert Lovell, Nutley, N. J., assignor to The Nylok Corporation, New York, N. Y., a corporation of Delaware Application April 1, 1947, Serial No. 738,589

3 Claims. (Cl. 285—86)

The invention herein disclosed relates to a coupling especially adapted for uniting the ends of two hollow elements.

Couplings of the kind mentioned are used to unite the ends of successive hollow elements which encase certain elements, or carry fluids. The more common use for such couplings is in connecting fluid conductors such as oil lines, hose and the like. Many such couplings are used on various applications where they are subjected to vibration and shock of such nature as to tend to loosen the coupling. In cases of this kind where a loose coupling may result in serious complications, such for example as an airplane oil line or a spark plug coupling, the couplings must be checked and tightened at regular intervals.

An object of this invention is to provide a coupling of the kind mentioned which includes male and female threaded members and in which a locking action is effected between the threads of the members. Another object of the invention is to provide a coupling of this kind in which a resilient element is utilized to effect the locking action between the threads of the members. A further object of the invention is to provide a coupling of this kind in which the locking element forms a part of one of the members.

The foregoing objects and certain advantages that will hereinafter appear are realized in the embodiment of the invention illustrated in the accompanying drawing and described in detail below, from which description a clearer understanding of the invention may be had.

Figure 2:
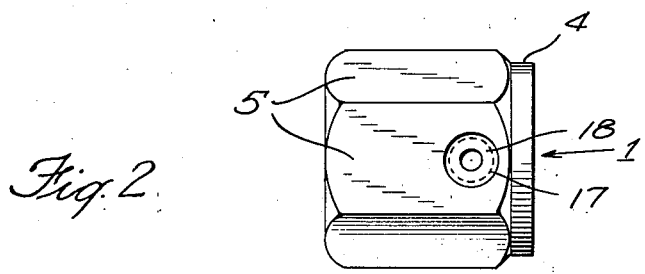
Figure 3:
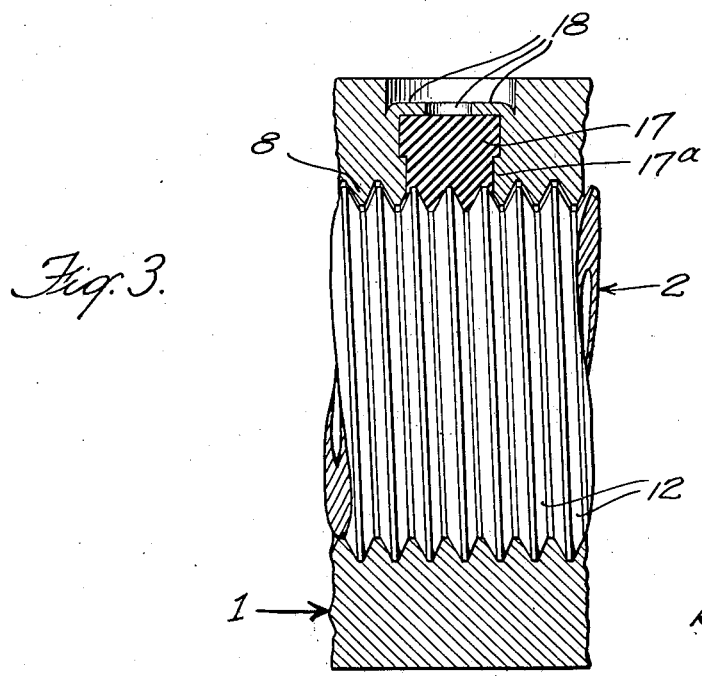

The drawing includes:

Fig. 1 which is a side elevation, partly in section, of a coupling embodying the invention;

Fig. 2 which is a side elevation of the internally threaded, female member of the coupling; and Fig. 3 which is an enlarged, fragmentary sectional elevation of the threaded portion of the coupling members and illustrating the locking action.

The coupling illustrated in the drawing primarily consists of two mating, threaded members, an internally threaded, female member 1, and an externally threaded, mating member 2. The internally threaded member is of hexagonal outer configuration and includes a body portion 3 and an extenson or collar 4 at one end thereof. The outer configuration is hexagonal to provide six wrench faces 5 that may be engaged by a wrench for tightening the coupling.

The member 1 is hollow and adapted to be rotatably secured on a tubular element 6 which constitutes one of the elements to be coupled together. A portion 7 of the member 1 is undercut internally to approximately the depth of the root of the thread 8. The end of this undercut portion terminates in a frustro-conical wall 9 which constitutes the inner surface of an inwardly extending, circumambient end flange 10. The member 1 is fitted over the tubular element 6 and the end of the element is flared outwardly to form an outwardly extending end flange 11 that is frustro-conical and comparable to the frustro-conical wall 9.

The member 2 has a thread 12, formed or cut on the outer surface thereof, which thread is the same as the thread 8 of the member 1 and mates therewith. The end portion 13 of the member 3 which enters the member 1, is frustro-conical in shape. At the end of the threaded portion of the member 2, opposite to the conical end 13, there is provided a hexagonal portion 14 to provide wrench faces 15. This member is secured to one end of a tubular element 16 which constitutes the other of the two elements to be coupled together.

In coupling the elements 6 and 16 together, the member 2 is threaded into the member 1. The conical end 13 of the member 2 is drawn home, tightly, against the flange 11 of the element 6. A fluid tight joint is thus assured as long as the end portion 13 of the member 2 is retained in tight clamping relation with the flange 11, which, under such circumstances, is clamped between the end portion 13 and the inner wall 9 of the inwardly extending flange 10.

Where such a coupling, in use, is not subjected to vibration and shock, it will normally remain tight. However, in most applications and particularly on moving vehicles, such couplings are subjected to vibration and shock which tends to effect relative rotation of the members in a direction to loosen the connection. To avoid such loosening of the coupling, the coupling illustrated in the drawing is constructed and arranged to effect a frictional locking action between the threads of the members.

For this purpose, a resilient element 17 is provided in the member 1. The wall of the member 1 is drilled radially to form a shouldered hole therethrough. Into this hole the resilient element 17 is inserted and makes a close fit therein so that it is restrained in all directions laterally of the axis thereof. The element 17 is positioned in the hole in the wall of the member 1 so that the inner end thereof extends inwardly beyond the root of the thread 8 and desirably is tangent to the circle of the minor diameter of the thread. The length of the element 17 is less than the thickness of the wall of the member 1, and it is positioned as above described. The element 17 is restrained against radially inward movement by a shoulder 17a formed thereon and engaging the shoulder formed in the hole through the wall, and against radially outward movement by a circumferential tang 18. The tang 18 is desirably cut from the wall of the hole in the member 1 and bent over the end of the resilient element 17.

Desirably, the resilient element 17 is a plug of non-metallic, resilient material. While several materials are suitable for this purpose, certain of the polyamides derived from polyamide-forming materials of the class consisting of aminocarboxylic acids and mixtures of polyamines with polycarboxylic acids. Such polyamides are available on the market under the designation of "nylon." Polyamides particularly suitable for the present purpose include polyhexamethylene adipamide, polyhexamethylene sebacamide, poly-epsilonaminocaproamide, polytetramethylene adipamide, polyhexamethylene terephthalamide, and mixtures of these polyamides. Especially desirable are the synthetic linear polyamides melting at comparatively high temperatures, above one hundred degrees centigrade.

With the construction above described, upon the engagement of the threads of the members 1 and 2, the members are displaced transverse to the axis to effect a misalignment thereof and cause a frictional, locking engagement between the threads. This condition or relation is illustrated in Fig. 3 of the drawing. As the thread of the member 2 engages the plug 17, the plug is compressed but exerts a resilient force acting radially between the members 1 and 2. This force causes the portions of the threads 8 and 12 opposite to the plug to engage in intimate, surface contact so that a frictional locking force is effected between the surfaces thereof.

In effect, over approximately half of the circumference, the threads are wedged together, the tolerance being taken up at the plug 17 as illustrated. It is this thread engagement that effects the locking action because when "nylon" is used as the resilient element, the coefficient of friction between the "nylon" and the thread is materially less than the coefficient of friction of the engaging threads. "Nylon" also has many other advantages which include the fact that it is not affected by oils and grease and the fact that when compressed and released, it tends to return to its original shape. This latter characteristic makes it particularly desirable as the coupling may be disconnected and reconnected repeatedly without materially affecting the locking action. With a nylon insert, the frictional engagement effected between the threads of the members 1 and 2 is sufficient to prevent loosening of the members under vibration and shock ordinarily encountered in service.

From the foregoing description of the embodiment of the invention illustrated in the drawing, it will be apparent to those skilled in the art that by this invention there is provided a coupling especially adapted for coupling two hollow elements; that will maintain a fluid tight connection between the elements under conditions of vibration and shock; and that is comparatively inexpensive to manufacture.

It will be obvious that various changes may be made by those skilled in the art in the details of the embodiment of the invention illustrated in the drawing and described above within the principle and scope of the invention as expressed in the appended claims.

I claim:

1. As an article of manufacture, a hollow, internally threaded coupling member having a radial hole in the side wall thereof, and a non-metallic, resilient insert within the hole in the side wall, the resilient insert being restrained against lateral and outward movement and extending inwardly beyond the root of the thread, whereby upon engagement with an externally threaded, mating coupling member, the members are displaced transversely of the axis thereof and a frictional, locking engagement is effected between the threads of the members.

2. As a new article of manufacture, a coupling, suitable for coupling two hollow elements together, which coupling comprises in combination an internally threaded, female member adapted to be rotatably secured to one of the elements to be coupled together and having a single radial opening through the wall thereof, a resilient insert secured in the radial opening in the side wall of the female member, the resilient insert being restrained against lateral and outward movement and extending inwardly beyond the root of the thread of the female member, and a mating, externally threaded male member adapted to be secured to the other of the two elements to be coupled together, the resilient insert of the female member engaging the thread of the male member and displacing the mating threaded element transversely of the axis thereof, whereby a frictional locking engagement between the threads of the mating threaded elements is effected.

3. As an article of manufacture, a hollow, internally threaded coupling member adapted to engage in threaded engagement with a mated threaded coupling member having an external thread thereon, the internally threaded coupling member having a radial hole in the side walls thereof, a resilient insert secured within the hole in the side wall, the resilient insert being restrained against lateral and outward movement and extending inwardly beyond the root of the thread, and being of lesser length than the thickness of the wall, whereby upon engagement with an externally threaded, mating coupling member, the members are displaced transversely of the axis thereof by the action of the resilient element engaging the thread of the mating coupling member and a frictional locking engagement is effected between the threads of the members opposite the resilient insert.

ROBERT LOVELL.

REFERENCES CITED

The following references are of record in the file of this patent:

UNITED STATES PATENTS

| Number | Name | Date |
| --- | --- | --- |
| 1,985,325 | Nathan | Dec. 25, 1934 |
| 2,087,185 | Dillon | July 13, 1937 |
| 2,385,953 | Swanstrom | Oct. 2, 1945 |
| 2,405,822 | Franck | Aug. 13, 1946 |
| 2,443,145 | Payne | June 8, 1948 |